United States Patent [19]

Fock et al.

[11] Patent Number: 4,460,746
[45] Date of Patent: Jul. 17, 1984

[54] PROCESS FOR FLEXIBILIZING EPOXIDE RESINS

[75] Inventors: Jürgen Fock, Düsseldorf; Dietmar Schedlitzki, Essen; Holger Wacker, Essen-Überruhr, all of Fed. Rep. of Germany

[73] Assignee: Th. Goldschmidt Ag, Fed. Rep. of Germany

[21] Appl. No.: 329,416

[22] Filed: Dec. 10, 1981

[30] Foreign Application Priority Data

Jan. 17, 1981 [DE] Fed. Rep. of Germany ....... 3101343

[51] Int. Cl.$^3$ ...................... C08L 33/08; C08L 33/10; C08L 35/04; C08L 63/10
[52] U.S. Cl. .................................... 525/117; 525/119
[58] Field of Search ............................... 525/119, 117

[56] References Cited

U.S. PATENT DOCUMENTS

| 3,301,801 | 1/1967 | Gaske et al. | 525/119 |
| 3,960,824 | 6/1976 | Hicks | 525/119 |
| 4,332,713 | 6/1982 | Lehmann | 525/119 |

FOREIGN PATENT DOCUMENTS

| 700710 | 12/1964 | Canada | 525/119 |
| 2641107 | 3/1978 | Fed. Rep. of Germany | 525/119 |
| 991879 | 5/1965 | United Kingdom | 525/119 |

Primary Examiner—Allan Lieberman
Attorney, Agent, or Firm—Toren, McGeady and Stanger

[57] ABSTRACT

The invention relates to a process for flexibilizing epoxide resins by the addition of polymers which contain carboxyl groups by adding to the epoxide resins before they are cured, copolymers which are obtained by the conventional polymerization of:

($a_1$) 40 to 87 weight percent of one or several alkyl esters of acrylic and/or methacrylic acid with 1 to 8 carbon atoms in the alkyl radical, ($a_2$) 10 to 40 weight percent of vinyl acetate and/or acrylonitrile, ($a_3$) 1 to 20 weight percent of acrylic, methacrylic and/or itaconic acid, ($a_4$) 1 to 5 weight percent of glycidyl acrylate and/or glycidyl methacrylate, and ($a_5$) 0 to 35 weight percent of acrylic and/or vinyl monomers, which are different from the monomers $a_1$ to $a_4$ in the presence of a regulator, which contains mercapto groups and has at least one carboxyl group, and wherein the copolymers have an average molecular weight of 1,000 to 3,000 as measured in a vapor pressure osometer, and the polymers are added in such amounts that 1 to 60 mole percent of the epoxide groups react with the carboxyl groups of the copolymer.

The viscosity of the uncured epoxide resin is increased only moderately by the addition of the modifier. The cured, modified epoxide resins have a higher degree of elastification and can be used as adhesives which adhere well to contacting surfaces and as resins, for example, for the production of prepregs.

10 Claims, No Drawings

PROCESS FOR FLEXIBILIZING EPOXIDE RESINS

BACKGROUND OF THE INVENTION

1. Field of the Invention

The invention relates to a process for flexibilizing epoxide resins by the addition of polymers having carboxyl groups.

2. Description of the Prior Art

Various possibilities are known for flexibilizing epoxide resins. For example, flexibilizing can be achieved by using special hardeners, such as, polyaminoamides. In many cases however, the possibility of choice in regard to the hardener does not exist. This occurs, for example, when the curing temperature, the curing rate, or the glass transition temperature of the cured epoxide resin are stipulated. In these cases, one is forced to use hardeners, such as, dicyandiamide, polycarboxylic acid anhydrides or short-chain aliphatic polyamines. These, however, lead to brittle cured products. It is then necessary to flexibilize the epoxide resins by the addition of modifiers.

However, even in the case of flexible hardeners, for example, the polyaminoamides, an additional flexibilization of the epoxide resin is frequently desirable. For this purpose, the modifiers may be distributed in the epoxide resin in the form of a physical mixture or they may react with the epoxide resin. Most of the known modifiers belong to the group of nonreactive additives. In connection with this art, reference is made to the book by H. Jahn, "Epoxide Resins", VEB Deutscher Verlag fur Grundstoffindustrie, Leipzig, 1969.

As reactive modifiers, products are chosen which have groups which are capable of reacting with the epoxide groups of the epoxide resin, for example, carboxyl groups. Those skilled in the art will understand that, in order to make the curing of the epoxide resin still possible, only a portion of the epoxide groups may react with the modifier. The amount of modifier incorporated must however be sufficiently large so that the desired flexibilization is achieved.

As a reactive modifier, a butadiene acrylonitrile copolymer, having a molecular weight of 3,000 and terminal carboxyl groups, is known from U.S. Pat. No. 3,948,849. The epoxide resins are modified before being cured by heating the epoxide resins, which contains the modifier, to a temperature of 160° C. for about 30 minutes. By using epoxide resins so modified and adhesives, bondings with elastic joints are obtained. Such joints have the disadvantage that olefinic double bonds remain behind in the structure of the cured, modified epoxide resin and that these double bonds, because of their oxidizability, impair the chemical and physical properties of the cured resins.

SUMMARY OF THE INVENTION

We have discovered a method for flexibilizing epoxide resins by providing reactive modifiers the maximum elastification to be achieved without impairing the adhesion of the modified epoxide resins at the interface while minimizing the increase in viscosity of the epoxide resins being caused by the modifiers and the modified epoxide resins being chemically and physically stable in the cured state.

More particularly, we have discovered that by adding to the epoxide resins, before they are cured, copolymers obtained by the common polymerization of ($a_1$) 40 to 87 weight percent of one or several alkyl esters of acrylic and/or methacrylic acid with 1 to 8 carbon atoms in the alkyl radical, ($a_2$) 10 to 40 weight percent of vinyl acetate and/or acrylonitrile, ($a_3$) 1 to 20 weight percent of acrylic, methacrylic and/or itaconic acid, ($a_4$) 1 to 5 weight percent of acrylate and/or methacrylate, and ($a_5$) 0 to 35 weight percent of acrylic and/or vinyl monomers, which are different from the monomers $a_1$ to $a_4$ in the presence of a regulator, which contains mercapto groups and has at least one carboxyl group, and wherein the copolymers having an average molecular weight of 1,000 to 3,000, as measured in a vapor pressure osmometer, in such amounts, that 1 to 60 mole percent of the epoxide groups react with the carboxyl groups of the copolymer.

DESCRIPTION OF THE PREFERRED EMBODIMENT

Especially preferred as modifiers are copolymers having an average molecular weight of 1,500 to 2,500.

An especially good modification is achieved when the copolymers have an average of 1.5 to 2.5 carboxyl groups per molecule. The copolymers are obtained by known procedures through the radical polymerization of the monomers.

The monomers $a_1$, which form the main portion of the copolymer, may be alkyl esters of acrylic and/or methacrylic acid with 1 to 8 carbon atoms in the alkyl radical, for example, methyl acrylate or methacrylate, ethyl acrylate or methacrylate, butyl acrylate or methacrylate, 2-ethylhexyl acrylate or methacrylate.

The monomers $a_5$, which may optionally be present in the copolymer, but are not necessarily, may be, for example, acrylamide or methacrylamide, styrene, isopropylidene acetate or vinyl propionate.

As a mercapto group-containing regulator, which has at least one carboxyl group in the molecule especially thioglycolic acid, 3-mercaptopropionic acid or thiolactic acid are especially suitable. Further suitable are 2-mercapto-butyric acid, 3-mercapto-butyric acid, 2-mercapto-isobutyric acid, 2-mercapto-caproic acid, 2-mercapto-isocaprylic acid, mercapto-succinic acid, 2-mercapto-succinic acid monomethylester, 2-mercapto-stearic acid.

As epoxide resins, the epoxide resins known to those skilled in the art can be used. Especially preferred are epoxide resins based on bisphenol A or F epichlorohydrin. Further examples of epoxide resins are the diglycidyl ethers of hydrogenated bisphenol A, p-glycidyloxy-N, N-diglycidylaniline or cycloaliphatic polyepoxide compounds of the type described, for example, in H. Jahn "Epoxide Resins", VEB Deutscher Verlag fur Grundstoffindustrie, Leipzig, 1969, or by H. Batzer and F. Lohse in "Ullmanns Enzyklopadie der technischen Chemie", volume 10, pages 563 ff., 4th Edition, Verlag Chemie, Weinheim 1975.

The modification of the epoxide resins can be accomplished in various ways. For example, it is possible to add the amount of modifier to the total amount of epoxide resin. Even though the carboxyl groups of the modifier begin to react with the epoxide groups of the epoxide resin already at room temperature, the heating of the mixture to temperatures of 100° to 150° C. is nevertheless preferred. The reaction then proceeds within 30 minutes to 4 hours.

It is also possible to add the total amount of modifier to only a portion of the total amount of the epoxide resin. Under these conditions, it must be kept in mind that this modified partial amount of epoxide resins still contains a sufficient number of epoxide groups so that a reactive incorporation of this modified partial amount is ensured on mixing this amount with the remaining epoxide resin and subsequently curing. It suffices if the modified partial amount still has about 40 mole percent of the epoxide groups remaining. The advantages of this procedure is that the modification can be carried out by the producer. It is also possible to conduct the partial modification with an epoxide resin whose composition differs from the remaining amount of the epoxide resin. In particular, the partial modification can be carried out with an epoxide resin of lower viscosity. For this purpose, the diglycidyl ethers of aliphatic diols, for example, 1,4-butanediol, 1,6-hexanediol or neopentyl glycol are particularly suitable.

It may be advantageous to add a catalyst in an amount effective to accelerate the modification reaction to the mixture of the epoxide resin and carboxyl group-containing copolymer. Especially preferred as catalysts are the quaternary ammonium or phosphonium compounds, such as, for example, tetramethylammonium chloride or iodide, benzyltrimethylammonium chloride, tetrabutylphosphonium chloride or acetate.

For curing the modified epoxide resins, conventional hardeners may be used. The following hardeners are especially useful for hot curing, that is, for curing at temperatures above 130° C. to about 220° C.: dicyandiamide and its derivatives; polycarboxylic acid anhydrides, such as, phthalic anhydride, methylhexahydrophthalic anhydride, and pyromellitic dianhydride. For warm curing at temperatures around 100° C., aromatic polyamines are suitable, such as m-phenylenediamine and cycloaliphatic polyamines.

Curing at room temperature can be carried out with polyaminoamides, polyaminoimidazolines, modified aliphatic polyamines or polyetherpolyamines. Especially advantageous for the curing at room temperature are mixtures of polyaminoamides or polyaminoimidazolines on the one hand, and aliphatic polyamines or polyetherpolyamines on the other.

When using such a mixture of hardeners, particularly high strength values are obtained on gluing with the modified epoxide resins. The respective curing temperature and/or the curing time can be reduced or shortened by using known accelerators. Such accelerators are, for example, tertiary amines.

The curing of low molecular acrylate resins, which contain carboxyl groups and which are used as baking enamels, with relatively slight amounts of an epoxide resin is known from the journal "Farbe und Lacke", 82, (1976), pages 1105 ff. It could not be concluded from the compatibility of these products that an epoxide resin, as the predominant main product, could be modified with relatively slight amounts of a low molecular, carboxyl group-containing copolymer, so as to bring about a high degree of elastification on achieving adhesion with the cured epoxide resin.

The inventively modified epoxide resins are particularly suitable as adhesives, because they adhere well to the contacting surfaces which are to be joined and because they form an elastic adhesive joint. It is also possible, however, to impregnate carrier webs, such as, for example, fiberglass fleeces or woven fabric, with epoxide resins, which have not yet been cured and to cure them into laminates. They may be used, for example, in the electrical industry for curing printed circuits. A further possibility of using these so-called "prepregs" is in the manufacture of molded parts, for example, in boat building, as well as for repair purposes, for example, in car body construction. Moreover, the use of modified epoxide resins as lacquer raw materials or as casting resins is advantageous.

The following examples describe the preparation of the modifiers, the inventive modification of epoxide resins, and the properties of the uncured as well as the cured modified epoxide resins.

Preparation of Low Molecular Acrylic Polymers

To 120 g of boiling toluene, a solution of 400 g of the monomer mixture, 1.6 gazodiisobutyric dinitrile and 12 to 14 g of thioglycolic acid is added dropwise over a period of 1.5 hours with stirring and under nitrogen, while reflux is maintained. Subsequently, the mixture is heated for a further 2 hours under reflux. After the addition of 1.2 g of azodiisobutyric dinitrile, heating is continued for a further 1.5 hours under reflux. The solvent and slight amounts of unreacted monomers are removed under vacuum at a temperature of 80° to 110° C. The 100% acrylic polymers obtained are moderately to highly viscous at room temperature.

The composition of the monomers, the regulator content and the average molecular weight, measured in the vapor pressure osmometer are shown in Table 1.

Preparation of the Modified Epoxide Resins

For the preparation of the modified epoxide resins, mixtures of an epoxide resin formed from bishpenol A/epichlorohydrin, with an epoxide equivalent of 185 g/mole, are heated with stirring for 2 hours at 120° C. with varying amounts of the acrylic copolymers after the addition of 0.03% tetramethylammonium chloride. The reaction is carried out under nitrogen. The quantity ratios of epoxide resin to acrylic copolymers are shown in Table 1.

After cooling, epoxide resins are obtained which are liquid at room temperature and whose viscosity is only moderately higher than that of the unmodified epoxide resin (ca. 9,000 mPas at 25° C.). The viscosity and the epoxide equivalent of the modified epoxide resins are given in Table 1.

An acrylic copolymer composed of 82 weight percent n-butyl acrylate 15 weight percent vinyl acetate, 2 weight percent acrylic acid and 1.0 weight percent glycidyl methacrylate, which polymer is identified as No. 5 in Table 1, was used to prepare two adducts with each of the following:

(a)

70 g of acrylic copolymer No. 5
30 g of epoxide resin from bisphenol A/epichlorohydrin, epoxide equivalent = 185

(b)

80 g of acrylic polymer No. 5

20 g of neopentyl glycol diglycidyl ether of technical purity, epoxide equivalent = 150.

The adducts, obtained by heating for 2 hours at 120° C. with the addition of 0.03% tetramethylammonium chloride, have epoxide equivalents of
(a) 900
(b) 1,800.

The additional modified epoxide resins are prepared by mixing the adducts and the epoxide resin from bisphenol A/epichlorohydrin (epoxide equivalent of 185) at room temperature in the following ratios:

| Run No. | Modified Epoxide Resin Composition | Epoxide Equivalent |
|---|---|---|
| 6 | 25 g of adduct A<br>75 g of epoxide resin | 230 |
| 7 | 25 g of adduct B<br>75 g of epoxide resin | 238 |

(a) triethylenetetramine with a hydrogen equivalent of 25 g/gram equivalent
(b) a modified, cycloaliphatic polyamine with a hydrogen equivalent of 111 g/gram equivalent.

The hardeners are added to the modified epoxide resins in equivalent amounts.

Two strength tests are used for testing the application of the epoxide resin/hardener mixtures:
(a) bonding strength (tensile shear test) according to DIN 53 283,
(b) angle peel strength according to DIN 53 282.

For the bonding strength, 1.6 mm thick aluminum sheets are used and for the angle peel strength, 0.5 mm thick aluminum sheets of Al Cu Mg 2pl quality. Before being glued, the metal sheets are degreased and subjected to a chromate/sulfuric acid pickling process.

The epoxide resin/hardener mixtures forming the adhesive are applied in an amount of ca. 50 g/m² on the test metal sheets and cured for 20 minutes at 100° C. under a slight contacting pressure.

The glued test material is allowed to cool and the bonding and angle peel strengths are determined at 20° C. The values are given in Table 2. They show that, if the inventive modification of the epoxide resins is used, the angle peel strength as well as the bonding strength are increased considerably relative to the values obtained with the unmodified epoxide resin.

TABLE 1

(Composition and properties of modified epoxide resins)

| | Acrylic Copolymers | | | Modified Epoxide Resins | | | |
|---|---|---|---|---|---|---|---|
| Run No. | Composition of the monomers Weight % | Regulator (1) Weight % | Average Molecular Weight | Composition Epoxide Resin Parts by Weight | Acrylic Copolymer Parts by Weight | Epoxide Equivalent | Viscosity at 25° C. in mPas |
| 1 | 63,5 n-butyl acrylate a₁<br>32,0 Vinyl acetate a₂<br>3,5 Acrylic acid a₃<br>1,0 Glycidyl methacrylate a₄ | 3,5 Thioglycolic acid | 1750 | 90 | 10 | 208 | 23 000 |
| 2 | Like 1 | Like 1 | 1750 | 80 | 20 | 237 | 43 000 |
| 3 | 83,0 n-butyl acrylate a₁<br>14,0 Acrylonitrile a₂<br>3,0 Acrylic acid a₃<br>1,0 Glycidyl methacrylate a₄ | 3,0 Thioglycolic acid | 1960 | 80 | 20 | 235 | 39 000 |
| 4 | 67,5 2-Ethylhexyl acrylate a₁<br>28,0 Vinyl acetate a₂<br>3,5 Acrylic acid a₃<br>1,0 Glycidyl methacrylate a₄ | 3,5 Thioglycolic acid | 1700 | 85 | 15 | 236 | 31 000 |
| 5 | 82,0 n-butyl acrylate a₁<br>15,0 Vinyl acetate a₂<br>2,0 Acrylic acid a₃<br>1,0 Glycidyl methacrylate a₄ | 4,5 Thioglycolic acid | 1570 | 80 | 20 | 240 | 28 000 |

Properties of the Cured Modified Epoxide Resins (a) Warm-curing Epoxide Resin Systems Two different polyamine hardeners are used for the curing:

TABLE 2
(Strength tests of adhesive from modified expoxide resins and polyamine hardeners)

| Modified Epoxide Resin No. | | Polyamine Hardener | Bonding Strength DIN 53 283 N/mm² | Angle Peel Strength DIN 53 282 N/mm |
|---|---|---|---|---|
| In accordance with the invention | 1 | triethylenetetramine | 28 | 0,90 |
| | 2 | triethylenetetramine | 31 | 0,98 |
| | 3 | triethylenetetramine | 30 | 0,92 |
| | 4 | triethylenetetramine | 29 | 0,90 |
| | 1 | modified cycloaliphatic polyamine | 29 | 1,12 |
| | 2 | modified cycloaliphatic polyamine | 30 | 1,25 |
| | 3 | modified cycloaliphatic polyamine | 30 | 1,30 |
| | 4 | modified cycloaliphatic polyamine | 29 | 1,20 |
| Not with the invention | Unmodified Epoxide Resin X | triethylenetetramine | 19 | 0,08 |
| | | modified cycloaliphatic polyamine | 21 | 0,10 |

(X) Epoxide resin from bishpenol A/epichlorohydrin with an epoxide equivalent weight of 185 g/mole

(b) Hot-curing Epoxide Resin System

Hot-curing, one component epoxide resin systems are formulated from the modified epoxide resins and dicyandiamide as hardener. The adhesives are applied on ground steel samples and cured for 60 minutes at 180° C. under a slight contacting pressure. Subsequently, the bonding strength is measured according to DIN 53 283. The results are given in Table 3.

TABLE 3
(Bonding Strength of Hot-cured Adhesives)

| Modified Epoxide Resin No. | Bonding Strength N/mm² |
|---|---|
| 2 | 42 |
| 3 | 40 |
| 5 | 41 |
| 6 | 39 |
| Unmodified Epoxide Resin not in accordance with the invention | 3 |

(c) Cold Curing Epoxide Resin Systems

Two-component adhesives are formulated from the modified epoxide resins and a conventional commercial polyaminoamide (hydrogen equivalent=95, vicosity=2,500 mPas at 25° C.) as well as its mixture with an aliphatic ether diamine (hydrogen equivalent=50, vicosity=15 mPas at 25° C.) or a modified aliphatic polyamine (hydrogen equivalent=75, viscosity=400 mPas at 25° C.). The adhesives are applied to aluminum sheets, pretreated as under (a), and cured for three days at room temperature. Subsequently, the bonding strength is measured according to DIN 53 283. The results are set forth in Table 4. Here also it can be seen that improved strength values are obtained with the inventively modified epoxide resins.

TABLE 4
(Bonding Stength of Cold-cured Adhesives)

| Modified Epoxide Resin No. | Hardener composition Weight percent | Bonding Strength N/mm² |
|---|---|---|
| 2 | 100 polyaminoamide | 23 |
| 5 | 100 polyaminoamide | 29 |
| 6 | 100 polyaminoamide | 22 |
| 2 | 80 polyaminoamide + 20 aliphatic ether diamine | 27 |
| 3 | 80 polyaminoamide + 20 aliphatic ether diamine | 23 |
| 5 | 80 polyaminoamide + 20 aliphatic ether diamine | 27 |
| 6 | 80 polyaminoamide + 20 aliphatic ether diamine | 22 |
| 7 | 80 polyaminoamide + 20 aliphatic ether diamine | 23 |
| 2 | 85 polyaminoamide + 15 modified aliphatic polyamine | 34 |
| 3 | 85 polyaminoamide + 15 modified aliphatic polyamine | 26 |
| 5 | 85 polyaminoamide + 15 modified aliphatic polyamine | 27 |
| 6 | 85 polyaminoamide + 15 modified aliphatic polyamine | 23 |
| Not according to the invention | | |
| Unmodified Epoxide Resin | 100 polyaminoamide | 18 |
| | 80 polyaminoamide + 20 aliphatic ether diamine | 19 |
| | 85 polyaminoamide + 15 modified aliphatic polyamine | 18 |

We claim:

1. A method for flexibilizing epoxide resins comprising adding to the epoxide resins prior to curing, copolymers obtained by the polymerization of:
   ($a_1$) 40 to 87 weight percent of one or more alkyl esters of acrylic or methacrylic acid having 1 to 8 carbon atoms in the alkyl radical,
   ($a_2$) 10 to 40 weight percent of vinyl acetate or acrylonitrile,
   ($a_3$) 1 to 20 weight percent of acrylic, methacrylic or itaconic acid,
   ($a_4$) 1 to 5 weight percent of glycidyl acrylate or glycidyl methacrylate, and ($a_5$) 0 to 35 weight percent of acrylic or vinyl monomers which are different from the monomers $a_1$ to $a_4$, in the presence of a regulator, which contains mercapto groups and has at least one carboxyl group, wherein the copolymers having an average molecular weight of 1,000 to 3,000, as measured in a vapor pressure osometer, in amounts such that 1 to 60 mole percent of the epoxide groups of the epoxide resins react with the carboxyl groups of the copolymer.

2. The method of claim 1 wherein the copolymers have an average molecular weight of 1,500 to 2,500.

3. The method of claim 1 or claim 2 wherein the copolymers have an average of 1.5 to 2.5 carboxyl groups per molecule.

4. The method of claim 1 or claim 2 wherein accelerating catalysts are added to the polymerization mixture.

5. The method of claim 4 wherein the catalyst is a quaternary ammonium or phosphonium compound.

6. The method of claim 1 or claim 2 wherein only a first portion of the total amount of epoxide resin is modified with said copolymers such that at least 40 mole percent of the epoxide groups present at the start of the reaction still remain and that the said modified portion of epoxide resin is mixed with the remaining portion of epoxide resin.

7. The method of claim 6 wherein the epoxide resin used for said first portion has a structure which differs from that of the remaining portion of epoxide resin.

8. A flexibilized epoxide resin produced by the method of claim 1 or claim 2.

9. A flexibilized epoxide resin produced by the method of claim 6.

10. A flexibilized epoxide resin produced by the method of claim 7.

* * * * *